H. L. FREEHAFER.
VEHICLE SIGNAL.
APPLICATION FILED JAN. 14, 1916.
1,243,279.
Patented Oct. 16, 1917.
2 SHEETS—SHEET 2.
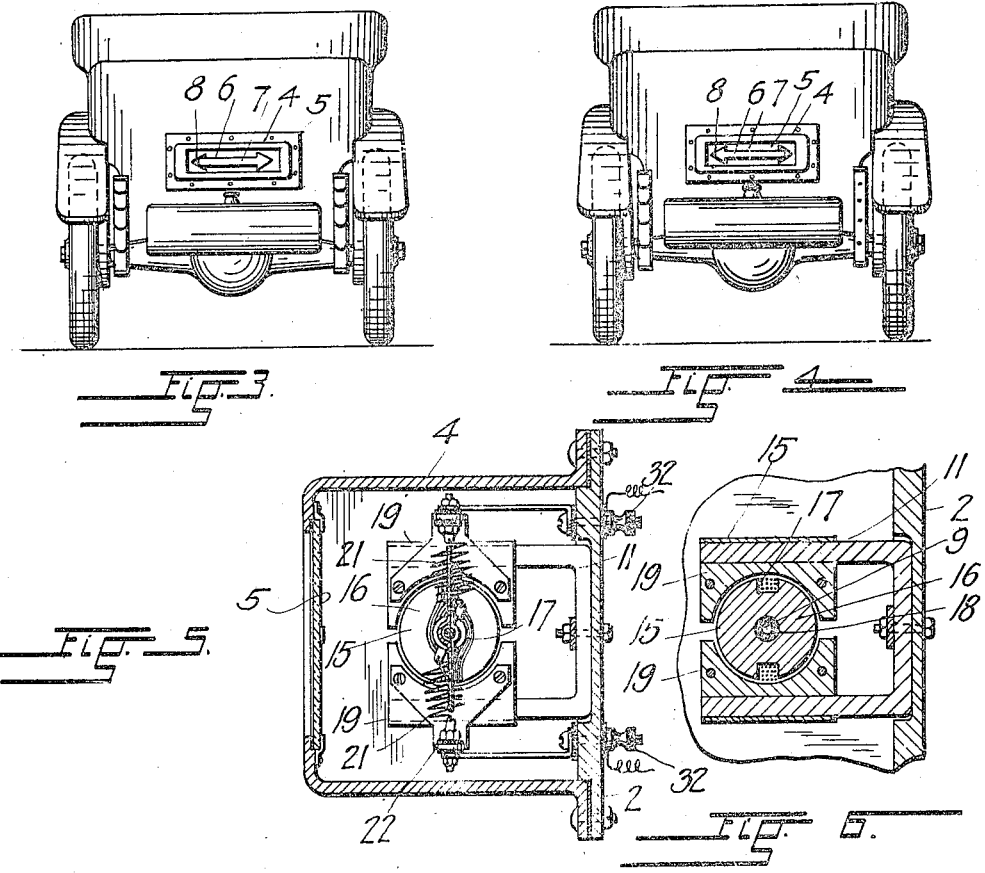
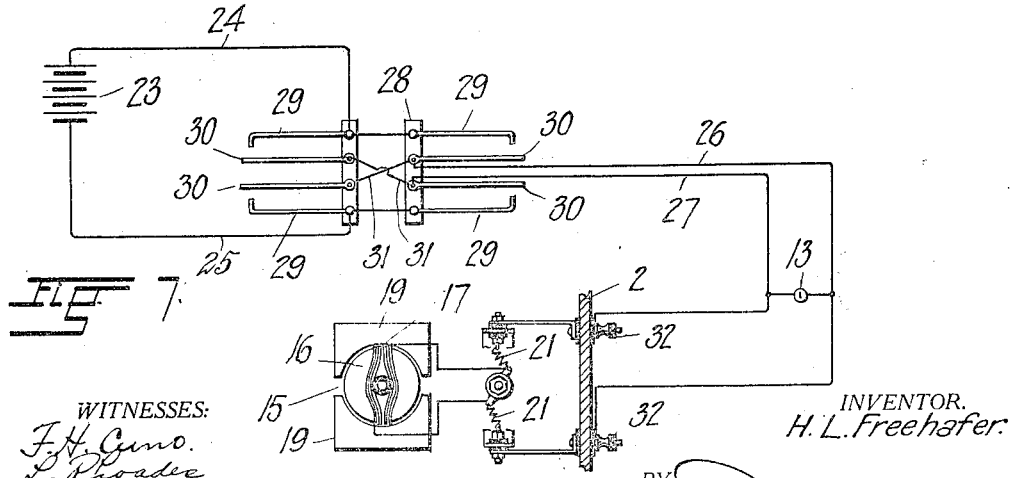
WITNESSES:
INVENTOR.
H. L. Freehafer.
BY
ATTORNEY.

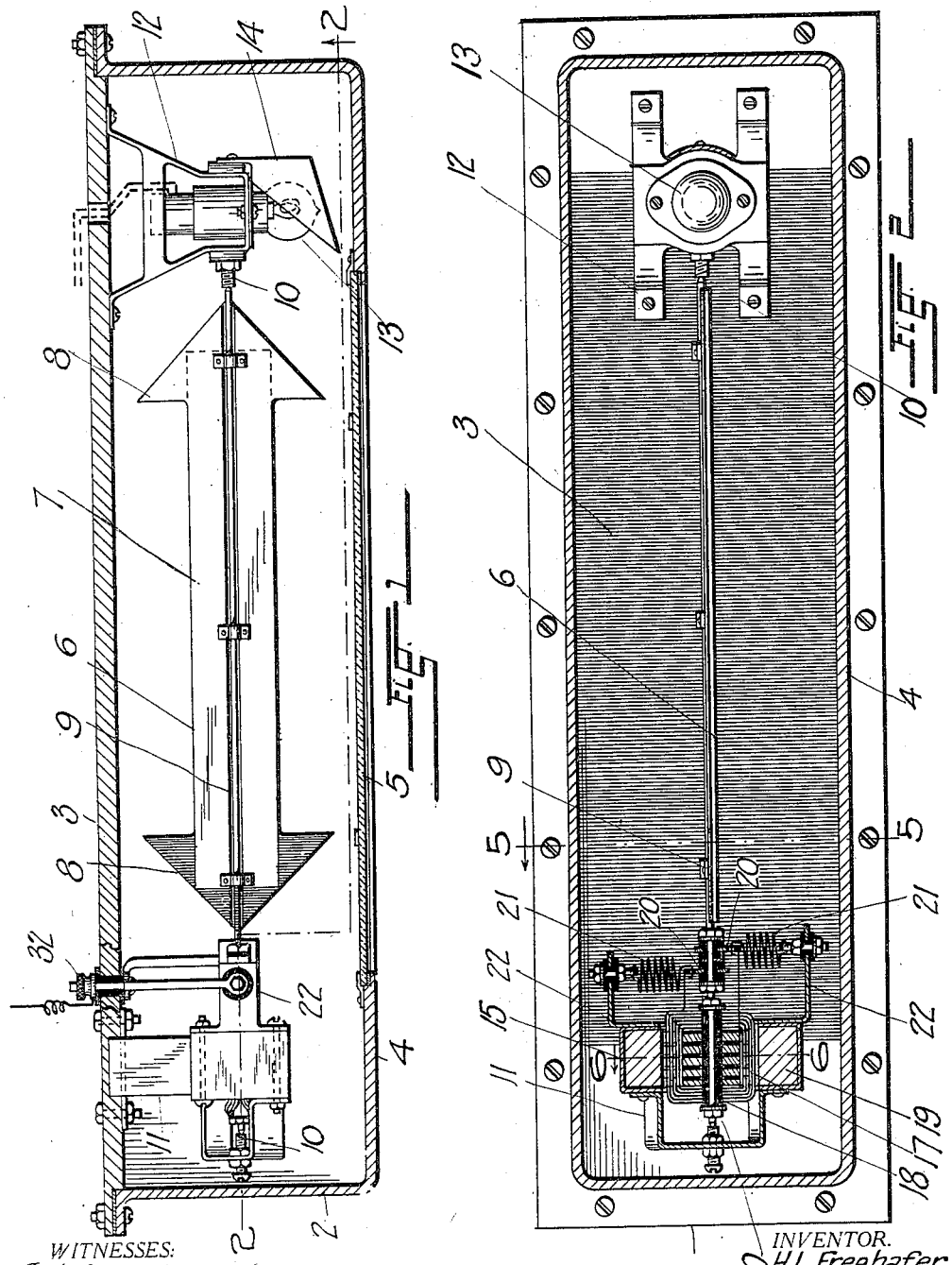

UNITED STATES PATENT OFFICE.

HOMER L. FREEHAFER, OF DENVER, COLORADO.

VEHICLE-SIGNAL.

1,243,279.   Specification of Letters Patent.   Patented Oct. 16, 1917.

Application filed January 14, 1916. Serial No. 72,102.

*To all whom it may concern:*

Be it known that I, HOMER L. FREEHAFER, a citizen of the United States, residing at Denver, in the county of Denver and State of Colorado, have invented certain new and useful Improvements in Vehicle-Signals, of which the following is a specification.

This invention relates to improvements in signaling devices for motor vehicles, and its primary object is to provide an electrically operating instrument of simple construction which is adjusted by movement of a switch in the circuit in which it is connected, to indicate to traffic officers, pedestrians or drivers of approaching or following vehicles, the direction in which a vehicle to which the invention is applied, is about to turn.

With the above objects in view, my invention consists of the features of construction and arrangement of parts shown in the accompanying drawings in the various views of which like parts are similarly designated, and in which, Figure 1 is a plan view of the instrument, the casing in which the operating mechanism is inclosed having been shown in section, Fig. 2, a longitudinal section along the line 2—2, Fig. 1, Figs. 3 and 4, rear views of a motor vehicle to which my invention is applied, with the indicatory element of the instrument in the positions to which it is moved for indicating proposed movements of the vehicle in opposite directions, Fig. 5, a transverse section taken along the line 5—5, Fig. 2, Fig. 6, a similar section taken along the line 6—6, Fig. 2, and Fig. 7, a diagrammatic view of the circuit in which the instrument is connected.

Referring to the drawings, the reference numeral 2 designates the casing of the instrument, composed of a back board 3 upon which the operating parts are mounted, and a box 4 which is removably fastened upon the back 3 and which in its face has a glass covered opening 5.

The operating mechanism of the instrument comprises a pointer composed of a flat blade 6 which is shaped to provide an elongated shank 7 and cuneiform points 8 at the opposite ends thereof.

The blade is painted on both sides, the shank and one of the points in a color sharply contrasting with that of the back 3 and the other point in a color which is similar to that of the back.

It will be readily understood that by the use of a pointer thus colored, the shank and one of its points can be distinguished at a distance while the other point is practically invisible by reason of the similarity of its color with that of the back of the casing, and that by coloring the points reversely at opposite sides of the blade the one pointer may be used to indicate opposite directions by reversing its position.

The pointer-blade is secured upon a shaft 9 which is rotatably supported between adjustable bearings 10 on brackets 11 and 12 secured upon the back-board of the instrument.

The bracket 12 at one end of the pointer, carries an incandescent lamp 13 and a reflector 14 for illuminating the instrument at night, and the bracket 11 at the opposite end of the same, constitutes the frame of a small electro-magnetic motor by which the blade is rotated through an arc of substantially ninety degrees.

The armature 15 of the motor consists of a core 16 carrying a single loop of wire 17 and mounted upon the shaft 9 through the intermediary of a bushing 18 of non-conducting material.

Pole pieces 19 are fixed in the motor frame to form the magnetic field and collecting rings 20 connected with the winding of the armature, are secured upon the shaft in insulated relation to each other.

Coiled springs 21 connecting the rings 20 with arms 22 of the motor-frame, at points diametrically opposite with respect to the rotary shaft, are insulated from the frame and connected in opposite sides of the circuit as shown in Fig. 7, and they thus perform the function of a resistance as well as that of a resilient means for yieldingly maintaining the pointer blade in its normal position.

The electric circuit in which the instrument is connected, may have a separate source of current, although I prefer to use for this purpose the battery of the starting, lighting or ignition systems of the motor-vehicle to which the invention is applied.

In the diagram shown in Fig. 7, 23 designates the source of electricity, 24, 25, 26 and 27 the conductors connecting the opposite poles thereof with the collecting rings of the motor, and 28 the switch which controls the flow of current through the circuit.

This switch is placed on the vehicle within easy reach of the driver and is of the reversing type so that by its proper adjustment, the direction of the current passing through the motor may be changed for rotating the pointer in either direction.

The switch has been shown in the drawing in a conventional form as being composed of two circuit closing elements 29 of the plug type, the movable contacts 30 of which are reversely connected by wires 31.

I desire it understood however, that any suitable switch adapted for operation either by hand of by foot-pressure may be used to effect a rotary movement of the motor-armature through a determinate angle in either direction for the adjustment of the pointer-blade to predetermined positions.

The incandescent lamp used to illuminate the pointer at night is connected in the same circuit as shown in Fig. 7 and the connections of the conductors with the collecting rings are established through the medium of binding posts 32 applied exteriorly of the casing in connection with the insulated ends of the combined resistance coils and return springs 21.

In the operation of my invention, the casing of the instrument which as shown in Figs. 3 and 4, is preferably applied at the rear of the vehicle, is secured in a horizontal position to a convenient part of the body or chassis of the same.

The pointer blade lies normally in a horizontal plane, that is, with one of its edges facing the glass covered opening of the casing, a position which obviously renders it practically invisible at a distance from the vehicle.

To indicate the direction in which the driver of the vehicle proposes to turn the same, the switch is closed to effect a flow of current through the winding of the motor which in consequence is rotated through an arc of approximately ninety degrees.

The pointer blade which rotates with the armature is thus positioned in a vertical plane or with one of its sides facing the opening in the casing, thereby rendering the portion thereof which is painted in contrast with the color of the back, clearly visible to drivers of following vehicles.

When the switch is reopened the blade returns to its normal position and it will be seen that by proper adjustment of the reversing switch, the blade may thus be turned in one direction or the other as shown in Figs. 3 and 4 to indicate by the coloring upon its sides, in what direction the vehicle is about to turn.

Having thus described my invention what I claim and desire to secure by Letters-Patent is:

1. In a vehicle-signal, a reversibly mounted pointer-blade, comprising a shank, at one end thereof a point of similar color, and at the opposite end of the same a point of different color.

2. In a vehicle-signal, a reversibly mounted pointer-blade comprising a shank, at one end thereof a point of similar color, and at the opposite end of the same a point of different color, and means for rotating said blade in either direction through an angle of substantially ninety degrees.

3. In a vehicle-signal, a reversibly mounted pointer-blade, comprising a shank, at one end thereof a point of similar color, and at the opposite end of the same a point of different color, an electric motor having its armature connected with the blade for its rotation, and a reversing switch in the motor-circuit to effect a current-flow through said armature in either direction.

4. In a vehicle-signal, a reversibly mounted pointer-blade, comprising a shank, at one end thereof a point of similar color, and at the opposite end of the same a point of different color, an electric motor having its armature connected with the blade for its rotation, a reversing switch in the motor-circuit, to effect a current flow through said armature in either direction, and a lamp in the circuit, disposed to illuminate the blade.

5. In a vehicle-signal, a back, and a pointer reversibly mounted in front thereof, and comprising a shank colored in contrast with the color of said back, at one of the ends of the shank a point of similar color, and at the opposite end of the same a point of a color similar to that of the back.

6. In a vehicle-signal, a back, a pointer reversibly mounted in front thereof, and comprising a shank colored in contrast with the color of said back, at one of the ends of the shank a point of similar color, and at the opposite end of the same, a point of a color similar to that of the back, and a casing connected with said back and having a glass-covered opening in front of the pointer.

In testimony whereof I have affixed my signature in presence of two witnesses.

HOMER L. FREEHAFER.

Witnesses:
   G. J. ROLLANDET,
   L. RHOADES.